United States Patent [19]
Honda et al.

[11] Patent Number: 5,161,178
[45] Date of Patent: Nov. 3, 1992

[54] IMAGE DISPLAY APPARATUS FOR RADIATION DIAGNOSIS

[75] Inventors: Michitaka Honda; Yoshinori Nakatani, both of Tochigi, Japan

[73] Assignee: Kabushiki Kaisha Toshiba, Kawasaki, Japan

[21] Appl. No.: 603,836

[22] Filed: Oct. 26, 1990

[30] Foreign Application Priority Data

Oct. 26, 1989 [JP] Japan .................................. 1-277195

[51] Int. Cl.⁵ .............................................. H05G 1/64
[52] U.S. Cl. ........................................ 378/99; 378/62; 358/111
[58] Field of Search ............................ 378/62, 99, 98; 358/111

[56] References Cited

U.S. PATENT DOCUMENTS

| | | | |
|---|---|---|---|
| 4,398,213 | 8/1983 | Haendle et al. | 358/111 |
| 4,459,990 | 7/1984 | Barnea | 128/654 |
| 4,581,635 | 4/1986 | Franke | 378/99 |
| 4,618,976 | 10/1986 | Haendle et al. | 358/111 |
| 4,636,850 | 1/1987 | Stewart | 378/99 |
| 4,663,773 | 5/1987 | Haendle et al. | 378/99 |
| 4,868,857 | 9/1989 | Dobbins, III | 378/62 |

Primary Examiner—David P. Porta
Attorney, Agent, or Firm—Finnegan, Henderson, Farabow, Garrett and Dunner

[57] ABSTRACT

Image data of a plurality of frames obtained upon irradiating a radiation onto an object to be examined, the object being injected with a catheter in a blood vessel thereof, are converted into digital image of a plurality of frames by an A/D. Digital image data of a first predetermined frame and digital image data of a second predetermined frame prior to the first predetermined frame, which are converted by the A/D, are alternately stored in first and second memories. A difference between the digital image data of the first predetermined frame output from the A/D and the digital image data of the second predetermined frame output from the one of first and second memories is calculated by a subtractor to obtain subtraction image data denoting a motion of the catheter. This subtraction image data is multiplied by a multiplier with a predetermined weighting factor input by a console to emphasize the subtraction image data, thereby displaying subtraction image data emphasized in correspondence with the catheter motion on a TV monitor.

13 Claims, 11 Drawing Sheets

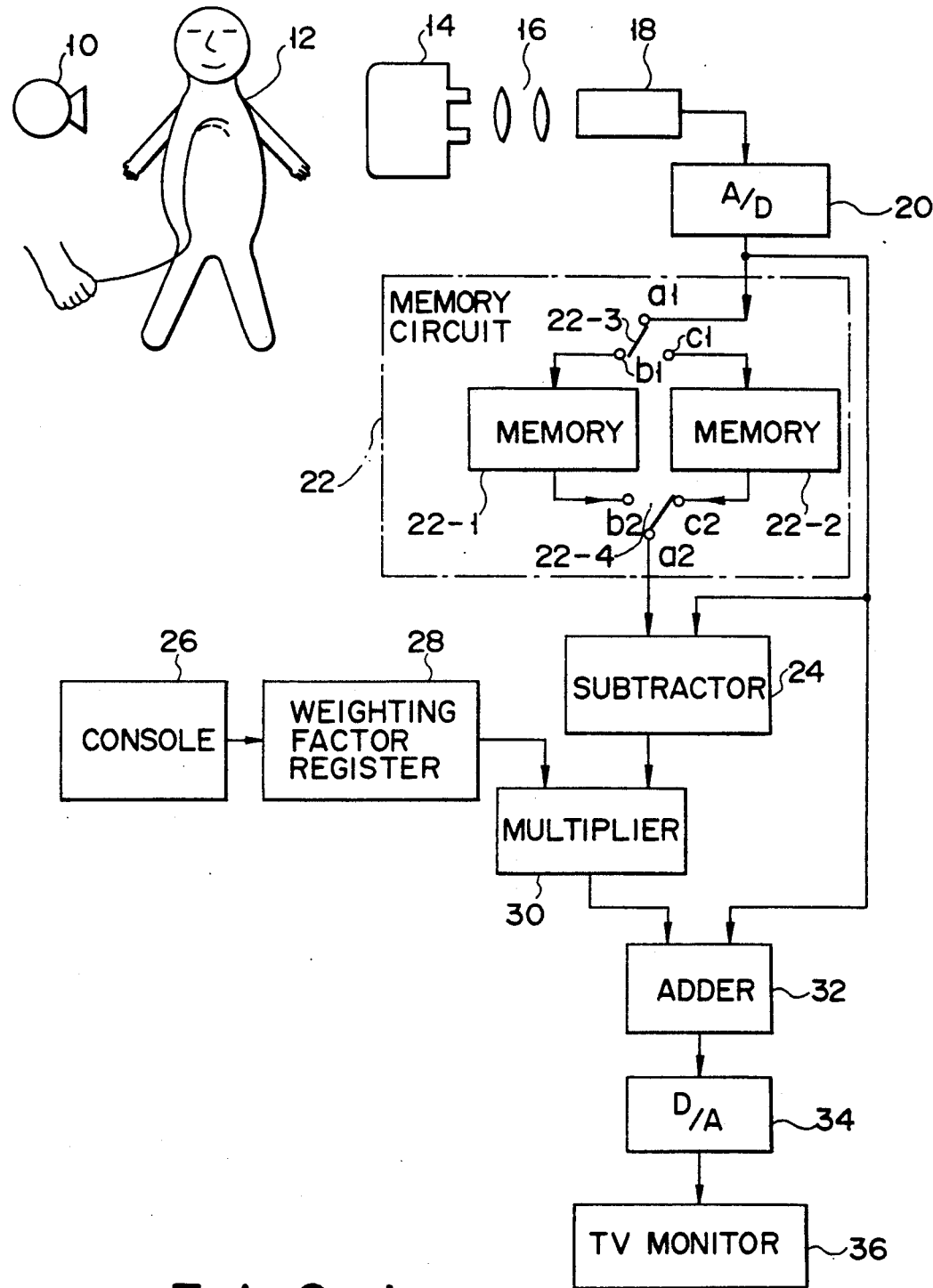
F I G. 1

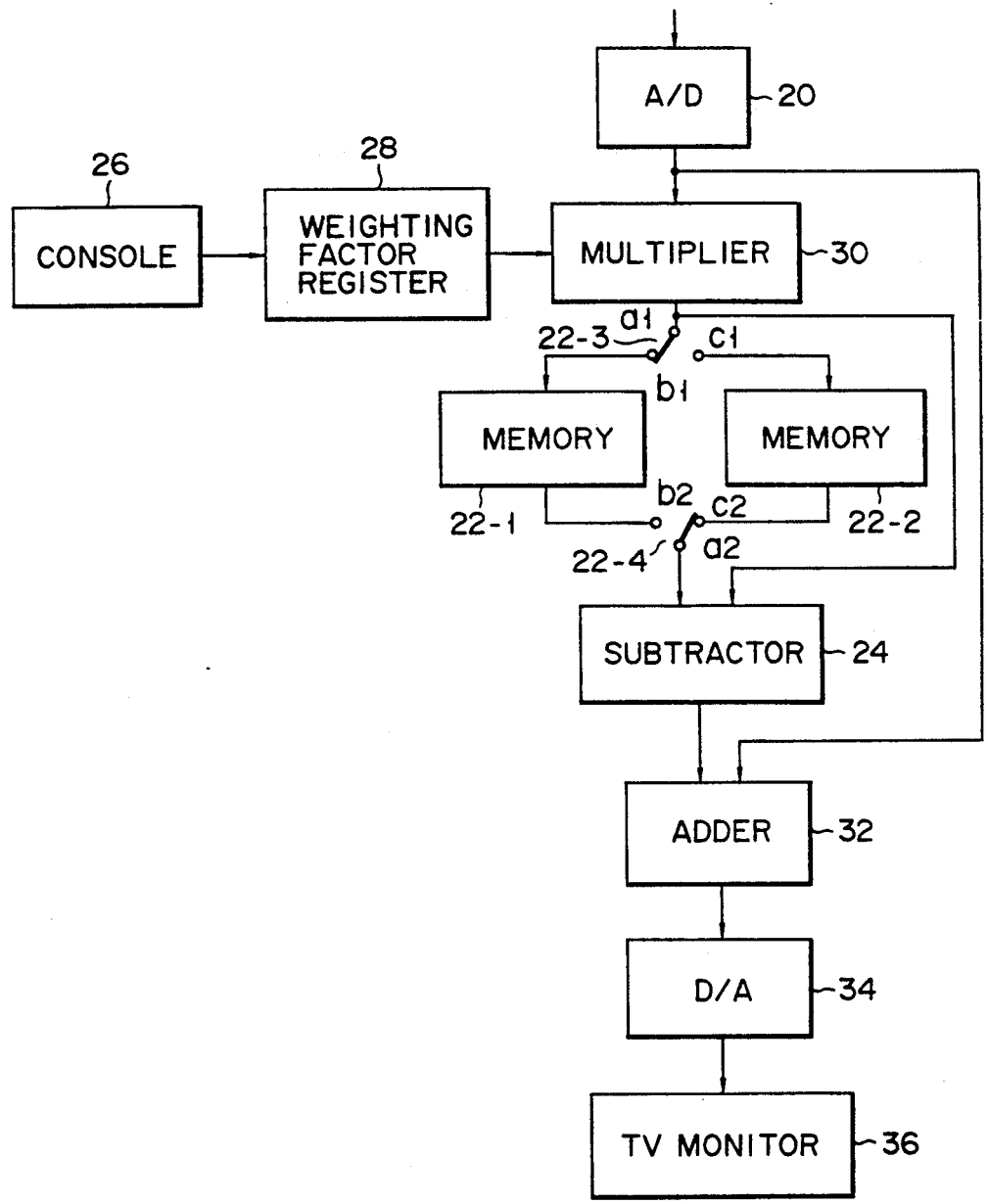
F I G. 3

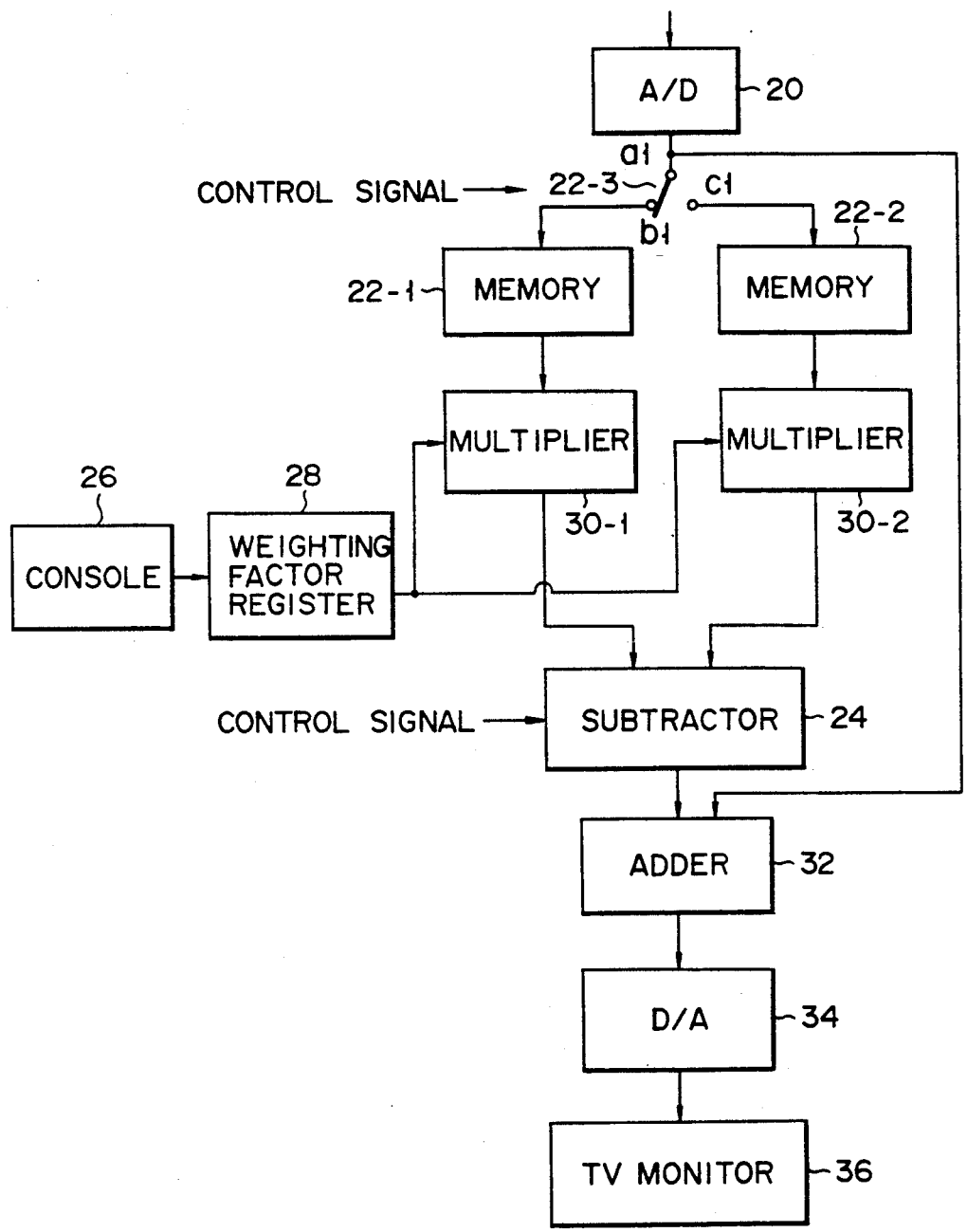
F I G. 4

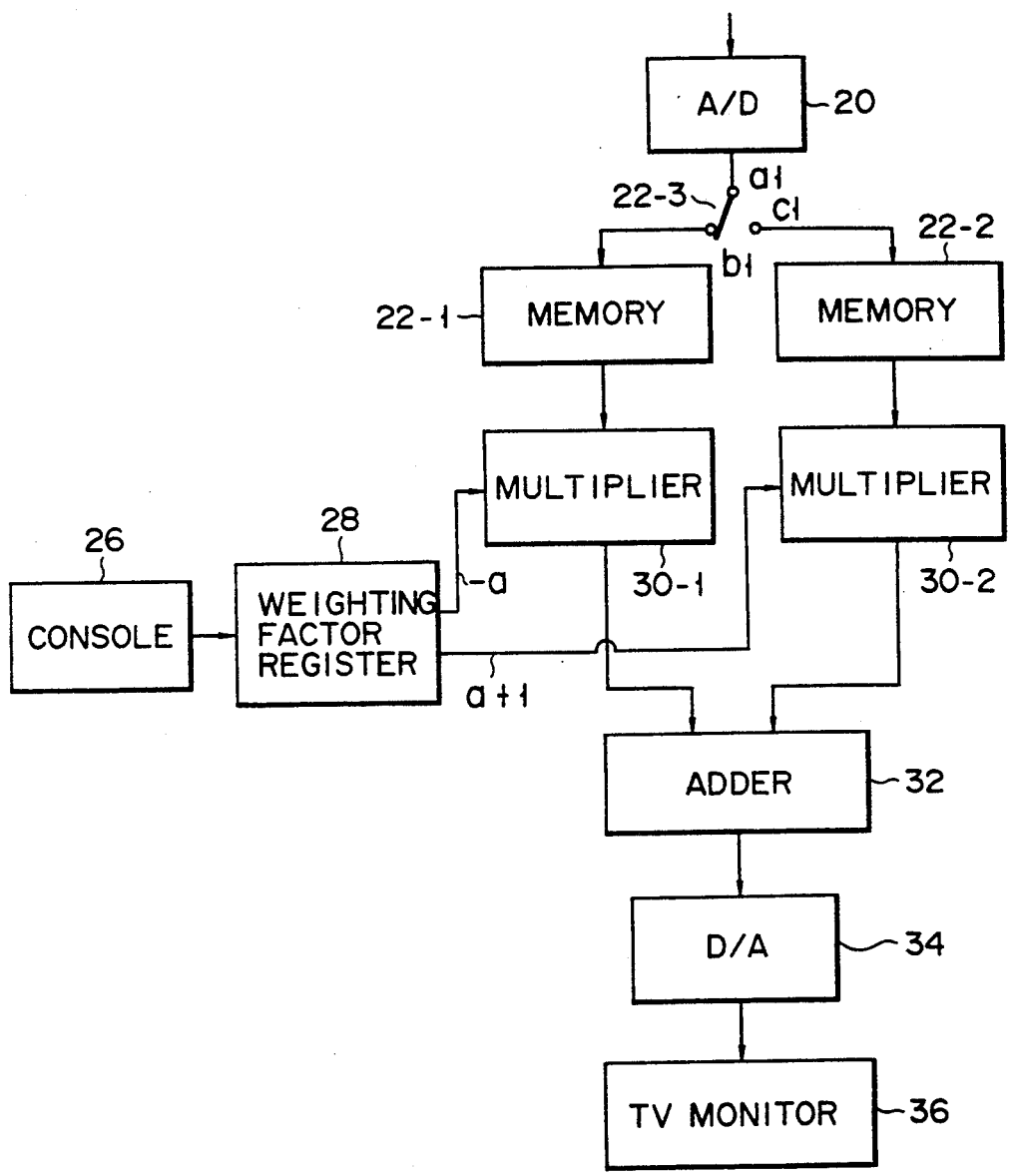
F I G. 5

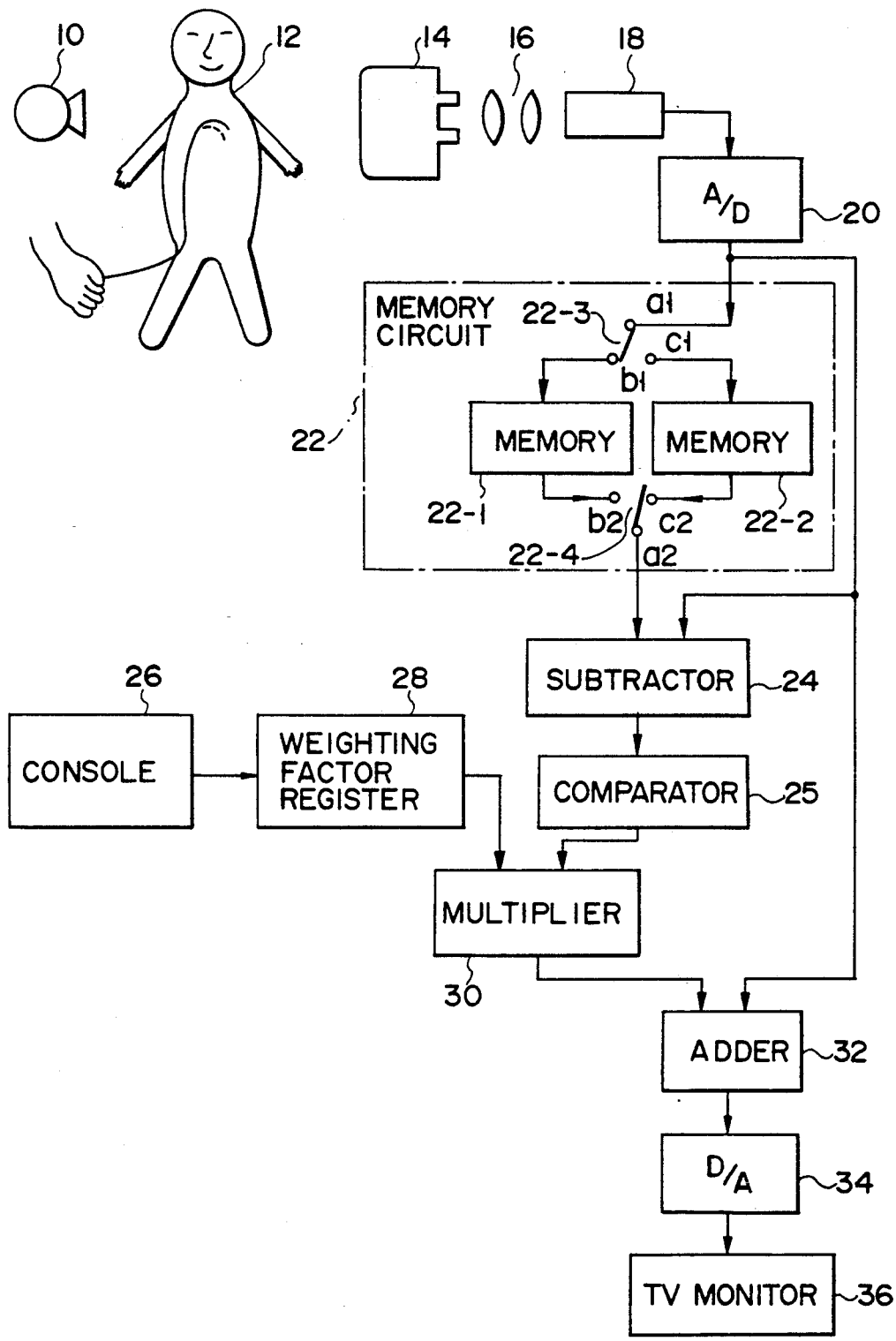
F I G. 6

HORIZONTAL-LINE PIXEL VALUE

OUTPUT OF COMPARATOR

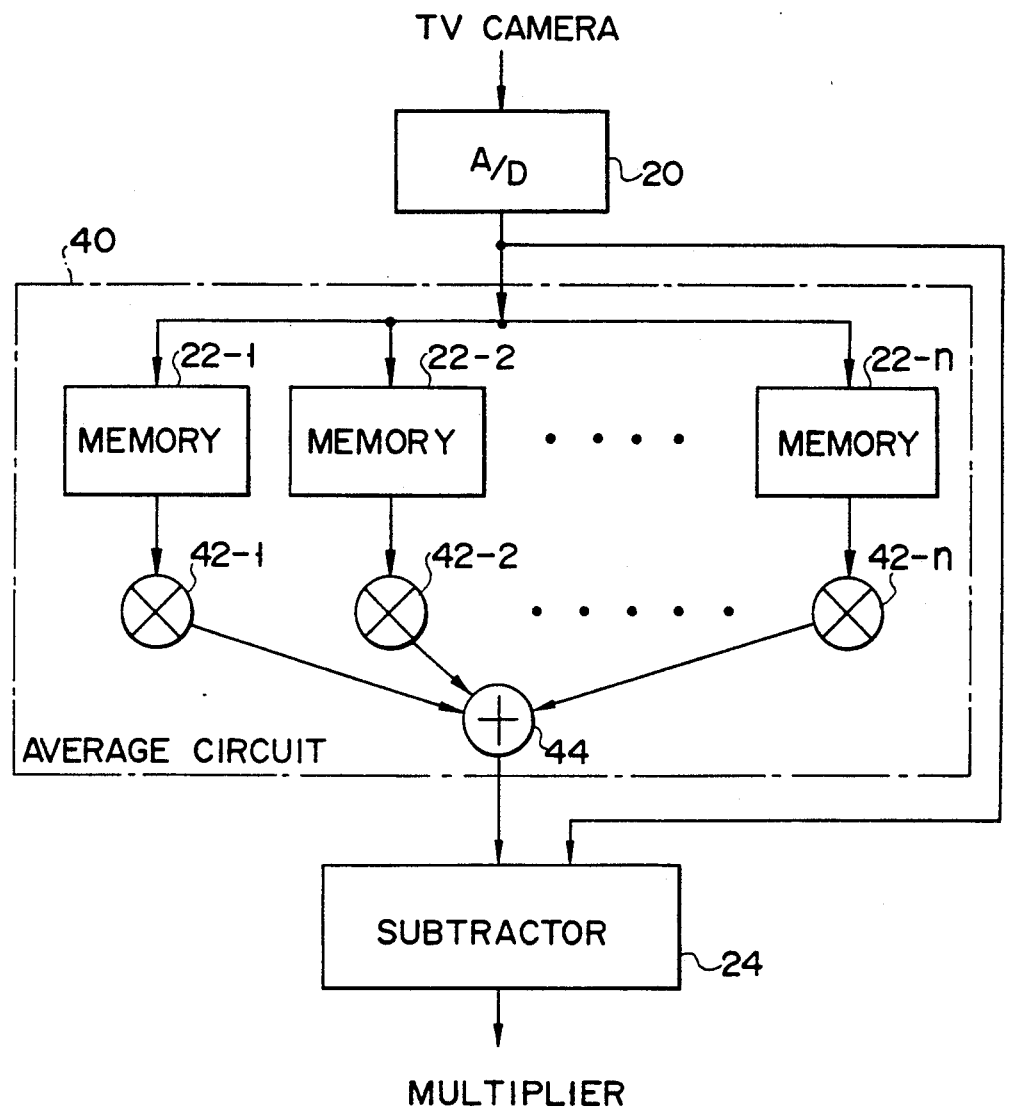
F I G. 9

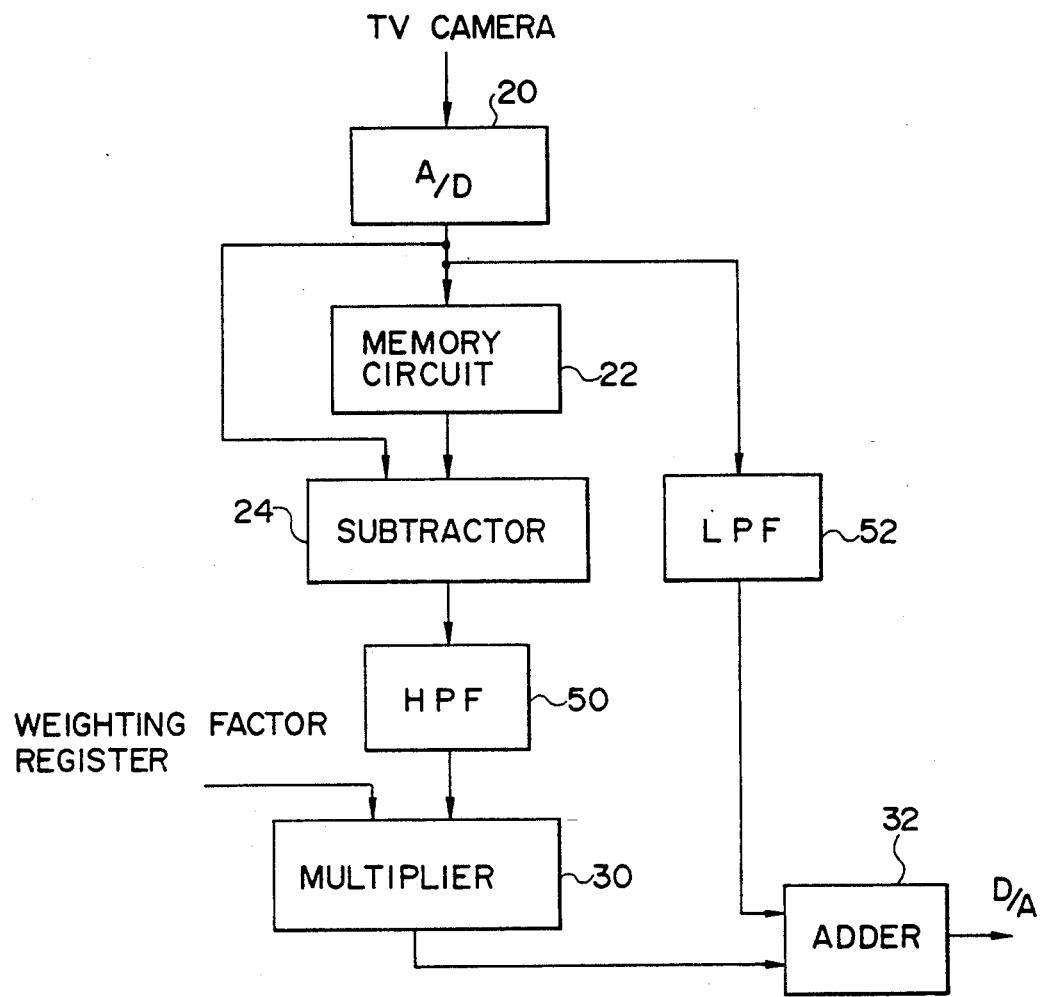
F I G. 10

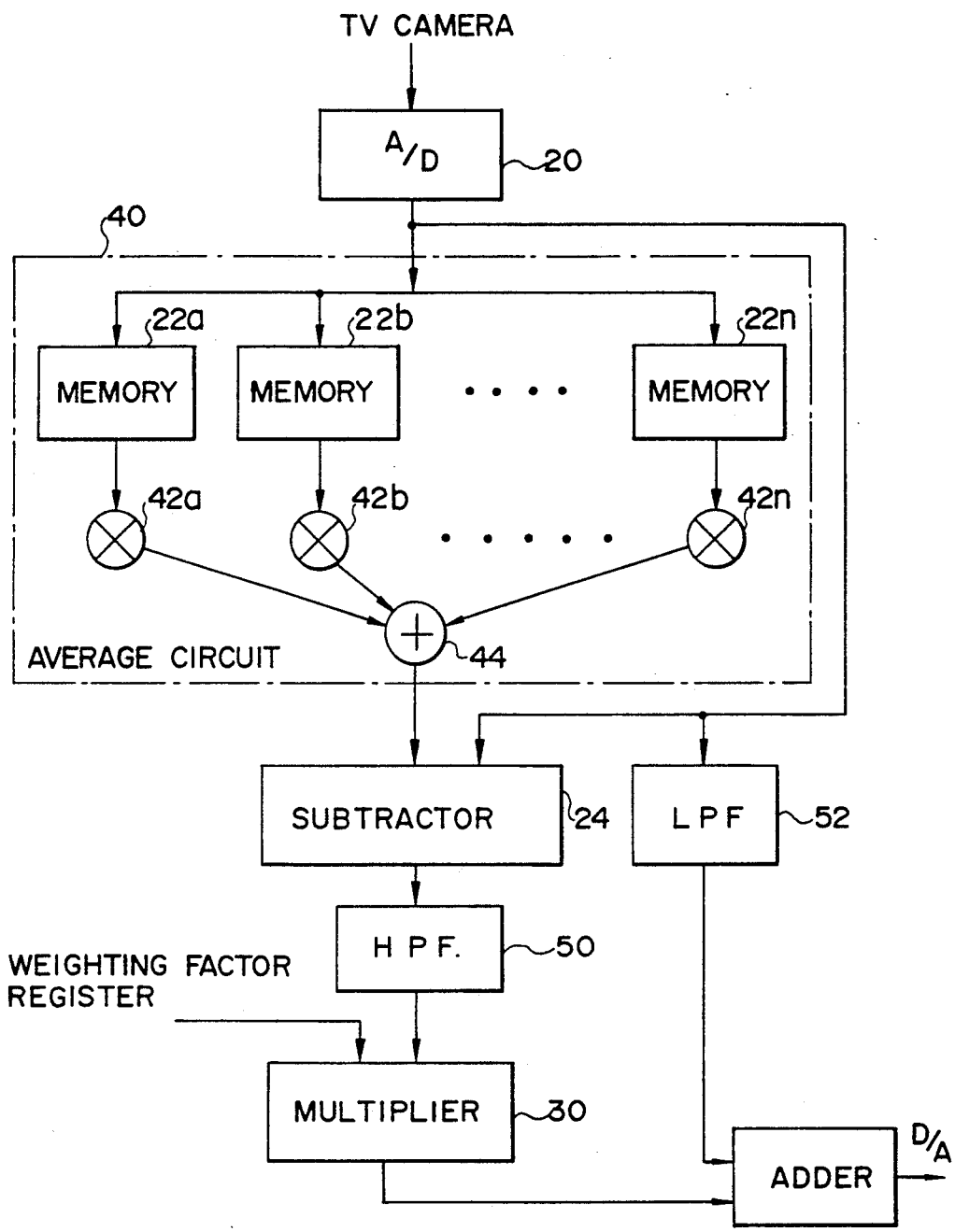
F I G. 11

IMAGE DISPLAY APPARATUS FOR RADIATION DIAGNOSIS

BACKGROUND OF THE INVENTION

1. Field of the Invention

The present invention relates to an image display apparatus for displaying an X-ray digital image as a typical radiation diagnosis image and, more particularly, to an image display apparatus for displaying an image to guide a catheter to a target portion of an object to be examined so as to perform radiation diagnosis.

2. Description of the Related Art

In an X-ray angiographic system, such as a typical conventional image display system for radiation diagnosis, intervention radiology is utilized. In this intervention radiology, a catheter is percutaneously injected into a patient and is guided to a morbid portion, and medicine is injected into the morbid portion through the catheter.

An application of intervention radiology to an X-ray diagnostic apparatus will be described below. X-rays emitted from an X-ray tube are transmitted through the object, and the transmitted X-rays are detected and converted into an optical image by an image intensifier. This optical image is converted into a TV video signal by a TV camera through a lens system. The TV video signal is input to a TV monitor. A fluoroscopic image of a bone portion and the like of the object is displayed on the TV monitor.

In this X-ray fluoroscopic state, an operator inserts a catheter and a guide wire into a blood vessel of the patient. The following operations have been desired. The operator can confirm the position of the catheter while observing the fluoroscopic image displayed on the TV monitor. The operator can inject the catheter into the blood vessel while manipulating the guide wire, so that the catheter can be guided to a target portion.

However, when the thickness of the object is large, the amount of X-rays transmitted through the object is small and sand-like photon noise is generated. In addition, the amount of X-rays emitted from the X-ray tube is not uniform, and the sand-like photon noise is generated when the amount of X-rays emitted from the X-ray tube is not uniform. Since the photon noise is present in the fluoroscopic image when the amount of X-rays transmitted through the object is small, the guide wire and the catheter cannot be easily observed. For this reason, the operator can not see the guide direction of the catheter inside the blood vessel when the photon noise is present. It is thus difficult for the operator to insert the catheter inside the blood vessel. If the amount of X-rays transmitted through the object is increased by an increase in voltage applied to the X-ray tube, the ratio of signal components of the fluoroscopic image to photon noise is increased to allow the operator to easily observe the guide wire and the catheter. However, if the dose of the X-rays irradiated onto the patient is increased, the patient may be adversely affected by the large amount of X-rays.

SUMMARY OF THE INVENTION

It is an object of the present invention to provide an image display apparatus for radiation diagnosis capable of obtaining a fluoroscopic image which allows an operator to easily recognize a catheter and reduce the load on the operator without increasing the amount of X-rays transmitted through the patient to be examined.

According to the present invention, there is provided an image display apparatus for radiation diagnosis, comprising: image input means for inputting image data of a plurality of frames obtained by irradiating a radiation onto an object to be examined, the object being injected with a catheter in a blood vessel thereof; emphasizing means, responsive to the image input means, for processing the image data so as to emphasize a difference between image data of the first and second predetermined frames in the inputting image data; and display means, responsive to the emphasizing means, for displaying the emphasized image data which is processed by the emphasizing means.

According to the present invention, since the image data emphasizes a difference between image data of the first and second predetermined frames in the inputting image data, the motion of the catheter inserted into the body can be easily identified. Therefore, the operator can easily manipulate the catheter, and the load on the operator can be reduced without increasing an amount of radiation transmitted through the patient to be examined.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing a schematic arrangement of an image display apparatus for radiation diagnosis according to the first embodiment of the present invention;

FIG. 3 is a block diagram showing the second embodiment of the present invention;

FIG. 4 is a block diagram showing the third embodiment of the present invention;

FIG. 5 is a block diagram showing the fourth embodiment of the present invention;

FIG. 6 is a block diagram showing a schematic arrangement of the fifth embodiment of the present invention;

FIG. 9 is a block diagram showing a main part of the sixth embodiment of the present invention;

FIG. 10 is a block diagram showing a main part of the seventh embodiment of the present invention; and FIG. 11 is a block diagram showing a main part of the eighth embodiment of the present invention.

DETAILED DESCRIPTION OF THE PREFERRED EMBODIMENTS

Figure 2:
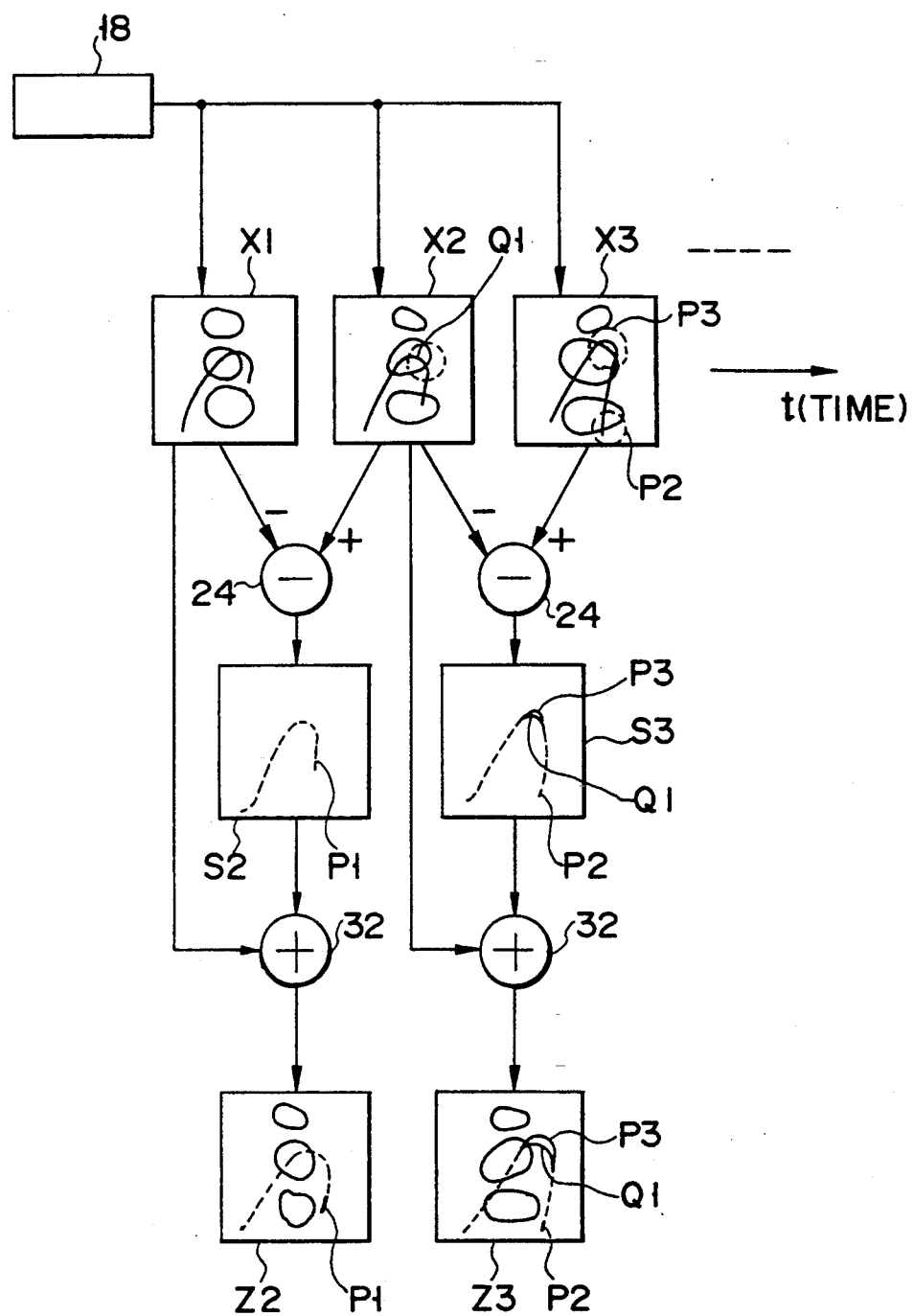
FIG. 2 is a view for explaining a display of emphasized subtraction image data in the first embodiment.

FIG. 1 is a block diagram showing a schematic arrangement of an image display apparatus for radiation diagnosis according to a first embodiment of the present invention, and FIG. 2 is a view for explaining a display of emphasized subtraction image data in the first embodiment.

Referring to FIG. 1, an X-ray tube 10 as a typical radiation generating means emits X-ray pulses every predetermined period of time to a patient. The X-ray tube may continuously generate a predetermined amount of X-rays. An image intensifier 14 detects X-ray pulses transmitted through the patient 12 and converts these X-ray pulses into optical images. A TV camera 18 converts, into fluoroscopic frame image data, optical images of a plurality of frames incident every predetermined period of time from the image intensifier 14 through an optical system 16 such as a lens.

An analog/digital converter (to be referred to as an A/D hereinafter) 20 serving as an image output means is connected to the TV camera 18 and converts the analog fluoroscopic image data into digital image data. The output terminal of the A/D 20 is connected to a memory circuit 22.

The memory circuit 22 is arranged as follows. Digital image data for each frame continuously supplied from the A/D 20 are alternately written in two memories 22-1 and 22-2. A common terminal $a_1$ of a SW switch 22-3 is connected to the output terminal of the A/D 20, and terminals $b_1$ and $c_1$ of the SW switch 22-3 are connected to memories 22-1 and 22 2. The SW 22-3 is interlocked with the frame period of the output from the A/D 20, so that the digital frame image data are alternately supplied to the memories 22-1 and 22-2. A terminal $a_2$ of a SW switch 22-4 is connected to a subtractor 24. When the terminal $b_1$ of the SW switch 22-3 is selected, the SW switch 22-4 is switched to a terminal $c_2$. However, when the terminal $c_1$ of the SW switch 22-3 is complementally selected, the SW 22-4 is switched to a terminal $b_2$. Therefore, the digital frame data are alternately supplied from the memories 22-1 and 22-2 to the subtractor 24.

In the memory circuit 22, when digital frame image data is written in one of the memories 22-1 and 22-2, digital image data of the immediately preceding frame is read out from the other memory to the subtractor 24.

The subtractor 24 operates as a subtracting means to subtracts the digital image data of the immediately preceding frame supplied from the memory circuit 22 from the digital image data of each frame supplied directly from the A/D 20 and supplies resultant subtraction image data of each frame to a multiplier 30.

A console 26 serves as an input means for inputting a weighting factor for emphasizing contrast of the subtraction image data output from the subtractor 24. This weighting factor is supplied to a weighting factor register 28. Note that the weighting factors are numeric values such as 10 and 100.

The weighting factor register 28 temporarily stores weighting factors supplied from the console 26. The output terminal of the subtractor 24 and the output terminal of the weighting factor register 28 are connected to the multiplier 30.

The multiplier 30, which serves as an emphasizing means, multiplies the subtraction image data output from the subtractor 24 with the weighting factor output from the weighting factor register 28, and outputs product data to an adder 32. The output terminal of the A/D 20 is also are connected to the adder 32.

The adder 32 adds the digital image data as a fluoroscopic frame image of a bone portion or the like output from the A/D 20 and the product data of each frame output from the multiplier 30, thereby obtaining overlapping image data.

A digital/analog converter (to be referred to as a D/A hereinafter) 34 is connected to the adder 32 and converts the digital overlapping image data into analog overlapping image data. The converted analog overlapping image data is supplied from the D/A 34 to a TV monitor 36.

An operation of the apparatus having the above arrangement will be described with reference to FIGS. 1 and 2. When an operator inserts a guide wire and a catheter into a blood vessel of an object to be examined, X-ray pulses are emitted from the X-ray tube 10 to the patient 12 every predetermined time interval. The X-ray pulses emitted from the X-ray tube 10 are transmitted through the patient 12, and the transmitted X-ray pulses are converted into an optical image by the image intensifier 14. This optical image is converted by the camera 18 into fluoroscopic image data which consists of one frame corresponding to the predetermined period of time and represents a bone portion and the catheter. Fluoroscopic image data of a plurality of frames successively corresponding to the predetermined periods of time are converted into digital image data of a plurality of frames by the A/D 20. The digital image data of the plurality of frames are sequentially stored in the memory circuit 22.

In the memory circuit 22, when the one-frame digital image data is written in the memory 22-1 through the terminal $b_1$ of the SW switch 22-3 shown in FIG. 1, digital image data of the immediately preceding frame is read out from the memory 22-2 through the terminal $c_2$ of the SW switch 22-4. When digital image data of a given frame is written in the memory 22-2 through the terminal $c_1$ of the SW switch 22-3, digital image data of the immediately preceding frame of the data written in the memory 22-2 is read out from the memory 22-1 through the terminal $b_2$ of the SW switch 22-4.

The digital image data of each frame output from the A/D 20 and the image data of the immediately preceding frame output from the memory 22 are supplied to the subtractor 24. The subtractor 24 subtracts the image data of the immediately preceding frame (fluoroscopic image $X_1$ in FIG. 2) from the memory 22 from the digital image data of each frame (fluoroscopic image $X_2$ in FIG. 2) output from the A/D 20 to obtain the subtraction image data of each frame (subtraction image $S_2$).

Similarly, the digital image data of the immediately preceding frames (fluoroscopic images $X_2$, $X_3$, $X_4$, ..., $X_{i-1}$, $X_i$, $X_{i+1}$, ...) are successively subtracted from the digital image data of the respective frames sequentially output from the A/D 20 to obtain subtraction data (subtraction images $S_3 = X_3 - X_2$, $S_4 = X_4 - X_3$, ...)

When the above subtraction processing is performed, a motion image portion of the catheter image can be obtained. For example, in the subtraction image $S_2$, only a black distal portion $P_1$ of the catheter is obtained. The catheter is present in a given portion $Q_1$ in the fluoroscopic image $X_2$. However, in the next fluoroscopic image $X_3$, the catheter is moved to other portions $P_2$ and $P_3$. As indicated by the subtraction image $S_3$, the catheter disappears from the portion $Q_1$, so that the portion $Q_1$ is displayed in white. Since the catheter is present in the other portions $P_2$ and $P_3$, the portions $P_2$ and $P_3$ are displayed in black. Remaining portions are displayed in gray. The portions $P_1$, $Q_1$, $P_2$, and $P_3$ may not displayed in white or black when a special catheter is used.

When the operator inputs a weighting factor from the console 26, this weighting factor data is temporarily stored in the weighting factor register 28. The weighting factor data output from the weighting factor register 28 is multiplied with the subtraction image data output from the subtractor 24. That is, by using a weighting factor, e.g., a predetermined value of "10", the contrast of the portion $P_1$ in the subtraction image $S_2$ and the portions $Q_1$, $P_2$, and $P_3$ in the subtraction image $S_3$ shown in FIG. 2 are emphasized 10 times as compared to that of the original subtraction image data. The emphasized image data is added to the original digital image data output from the A/D 20 by the adder 32. A sum image $Z_i$ is obtained as follows:

$$Z_i = a \cdot (X_i - X_{i-1}) + X_i$$

where a is the weighting coefficient. When this predetermined value is increased, motion portions of the subtraction images $S_2$ and $S_3$ shown in FIG. 2 are emphasized. A motion portion, in particular the distal portion of the catheter, in the fluoroscopic image can be easily recognized.

Even if the operator or doctor slightly moves the guide wire and the catheter, the distal portion $P_1$ and $P_2$ of the catheter are emphasized. The operator can easily manipulate the guide wire and the catheter.

A second embodiment of the present invention will be described below. FIG. 3 is a block diagram showing a schematic arrangement of the second embodiment of the present invention. In the second embodiment, the multiplier 30 used in the first embodiment is connected between the output terminal of an A/D 20 and a terminal $a_1$ of a SW switch 22-3, a weighting factor register 28 is connected to the multiplier 30, and a console 26 is connected to this weighting factor register 28. Note that the output terminal of the A/D 20 is connected to the input terminal of an adder 32, and the output terminal of the multiplier 30 is connected to the input terminal of a subtractor 24.

In the second embodiment with the above arrangement, a weighting factor a from the weighting factor register 28 is multiplied with digital image data $X_i$ of each frame from the A/D 20 by the multiplier 30, and image data $a \cdot X_i$ is input to the subtractor 24. Image data $a \cdot X_{i-1}$ of the immediately preceding frame is input from memory 22-1 or 22-2 to the subtractor 24. The subtractor 24 outputs subtraction image data $S_i = (a \cdot X_i - a \cdot X_{i-1})$. The digital image data $X_i$ of each frame from the A/D 20 and the subtraction image data $S_i = (a \cdot X_i - a \cdot X_{i-1})$ are added by an adder 32 to obtain a sum image $Z_i$ is follows:

$$Z_i = (a \cdot X_i - a \cdot X_{i-1}) + X_i$$

The image $Z_i$ obtained in the second embodiment is equal to the image $Z_i$ obtained in the first embodiment. The same effects are obtained in the first and second embodiments.

A third embodiment of the present invention will be described below. FIG. 4 is a block diagram showing a schematic arrangement according to the third embodiment of the present invention. A SW switch 22-3 is connected to the output terminal of an A/D 20, and multipliers 30-1 and 30-2 are connected to the output terminals of memories 22-1 and 22-2, respectively. The subtractor 24 switches the first and second terminals in response to the control signal which actuates the SW switch 22-3. The output terminals of the multipliers 30-1 and 30-2 are connected to the input terminals of a subtractor 24, and the output terminal of the subtractor 24 and the output terminal of the A/D 20 are connected to the input terminals of an adder 32. The output terminal of a weighting factor register 28 is connected to the input terminals of the multipliers 30-1 and 30-2.

In the third embodiment with the above arrangement, digital image data $X_i$ of the respective frames from the A/D 20 are alternately written in the memories 22-1 and 22-2 through the SW 22-3. When a weighting factor a is supplied from the weighting factor register 28 to the multipliers 30-1 and 30-2, the weighting factor a is multiplied with the digital image data $X_i$ of each frame from the memory 22-1 by the multiplier 30-1 at a timing for selecting a terminal $b_1$ of the SW switch 22-3, so that image data $a \cdot X_i$ is input to the subtractor 24. The weighting factor a is multiplied with digital image data $X_{i-1}$ of the immediately preceding frame of the frame of the digital image data $X_i$ from the memory 22-2 by the multiplier 30-2, so that image data $a \cdot X_{i-1}$ is input to the subtractor 24. The subtractor 24 outputs subtraction image data $S_i = (a \cdot X_i - a \cdot X_{i-1})$, and this data and the digital image data $X_i$ from the A/D 20 are added by the adder 32 to obtain an image $Z_i$ as follows:

$$Z_i = (a \cdot X_i - a \cdot X_{i-1}) + X_i$$

When a terminal $c_1$ of the SW switch 22-3 is selected, digital image data from the memory 22-1 serves as image data of the immediately preceding frame of the frame of the digital data from the memory 22-2, and the same operations as described above are performed. That is, the image $Z_i$ obtained in the third embodiment has the same effects as the image obtained in the first embodiment.

A fourth embodiment of the present invention will be described below. FIG. 5 is a block diagram showing a schematic arrangement of the fourth embodiment. The fourth embodiment is different from the third embodiment in that weighting factors $-a$ and $a+1$ are supplied from a weighting factor register 28 to multipliers 30-1 and 30-2 in units corresponding to frames, thereby eliminating the adder 32.

In the fourth embodiment with the above arrangement, the weighting factors $-a$ and $a+1$ from the weighting factor register 28 are alternately supplied to the multipliers 30-1 and 30-2 in units corresponding to frames. Image data $-a \cdot X_{i-1}$ from the multiplier 30-1 is input to the adder 32 and image data $(a+1) \cdot X_i$ from the multiplifier 30-2 is input to an adder 32 at a timing for selecting a terminal $b_1$ of an SW 22-3. The subtractor 24 outputs an image $Z_i$ as follows:

$$Z_i = (a+1) \cdot X_i - a \cdot X_i$$

When a terminal $c_1$ of the SW switch 22-3 is selected, the digital image data from a memory 22-1 serves as image data of the immediately preceding frame of the frame of the image data from a memory 22-2, and the same operations as described above are performed. That is, the image $Z_i$ obtained in the fourth embodiment has the same effect as the image obtained in the first embodiment.

Figure 7:
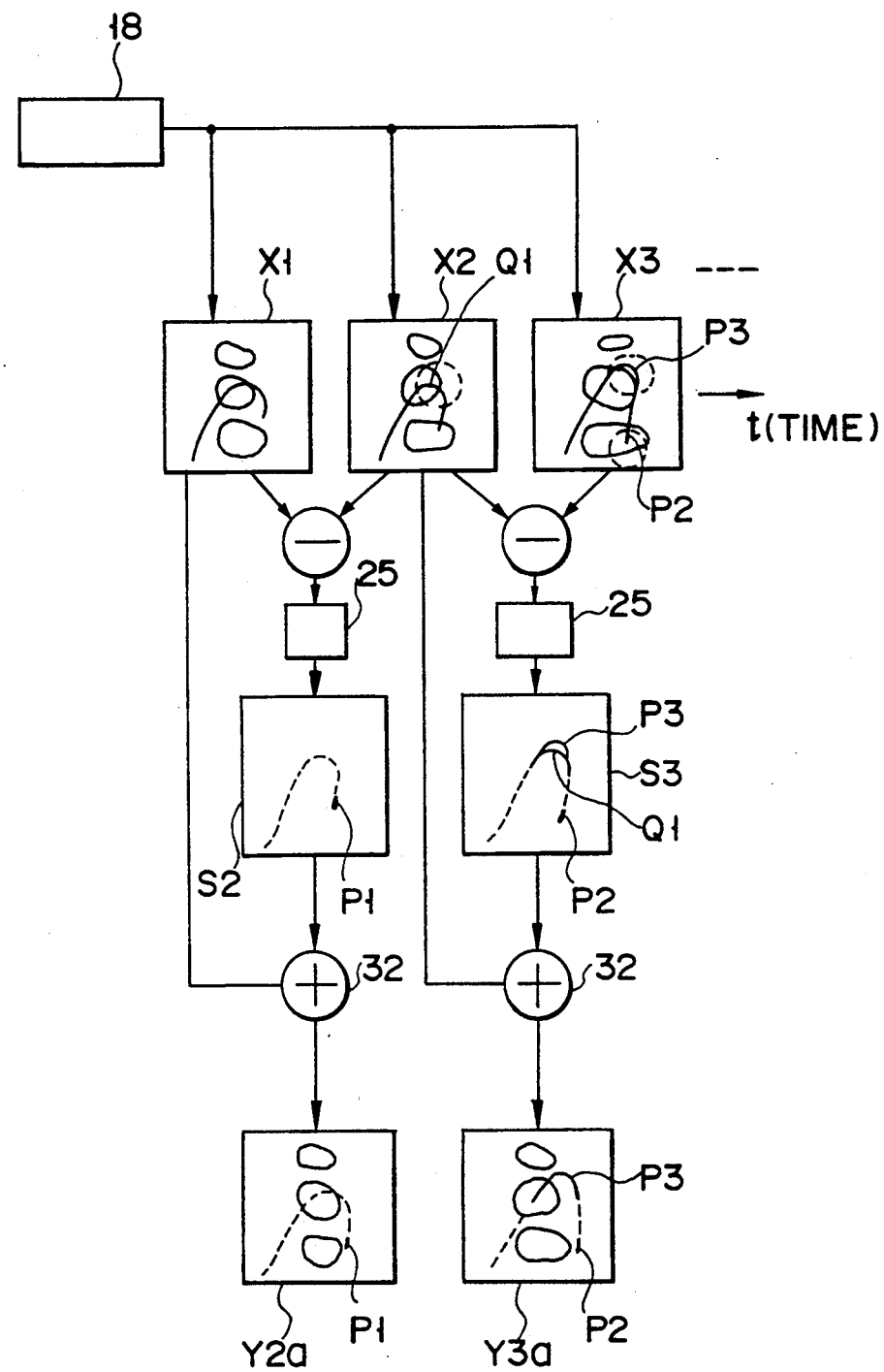
FIG. 7 shows a display of subtraction image data compared with a threshold level in the fifth embodiment.

A fifth embodiment of the present invention will be described below. FIG. 6 is a block diagram showing a schematic arrangement of the fifth embodiment of the present invention. FIG. 7 shows a display of the subtraction image data compared with a threshold value in the fifth embodiment. The fifth embodiment includes a comparator 25 between a subtractor 24 and a multiplier 30 in addition to the arrangement of FIG. 1.

The comparator 25 operates as a comparing means and compares each pixel value of subtraction image data of each frame received from the subtractor 24 with a predetermined threshold level THL and outputs only those pixel values of the subtraction image data which are smaller than the threshold level THL. In this case, the subtraction image data consists of pixel values which fall within the range of −100 to +100. The threshold level THL is a predetermined value (e.g., −50) falling within the range of −100 to 0.

Figure 8A:
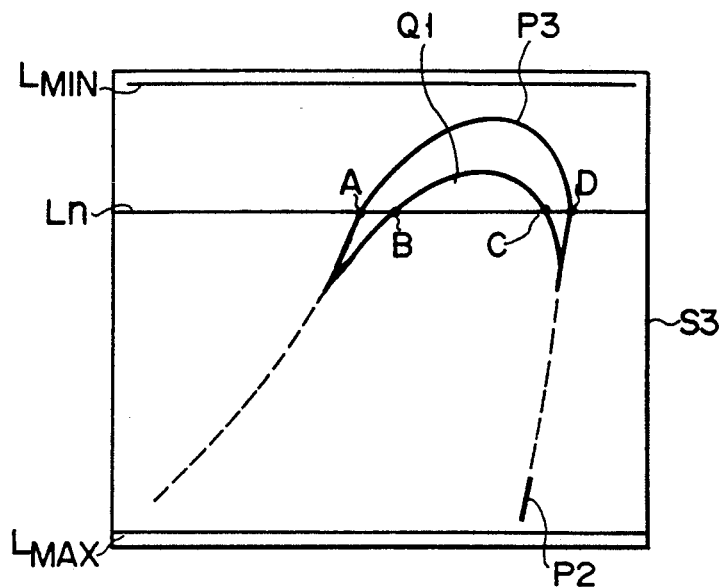
FIGS. 8A to 8C are views that comparatively illustrate the subtraction image data and the threshold level in the fifth embodiment.
Figure 8B:
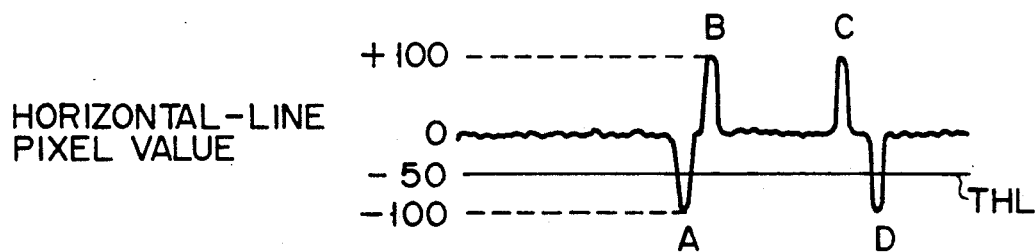
Figure 8C:
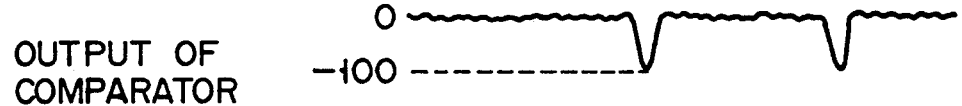

FIGS. 8A to 8C are views that comparatively illustrate subtraction image data and the threshold level in the fifth embodiment.

The operation of the comparator 25 will be described with reference to FIGS. 6 to 8C. Subtraction image data of each frame is supplied from the subtractor 24 to the comparator 25, pixel values of horizontal lines $L_{MIN}$ to $L_{MAX}$ of subtraction image data $S_3$ of a given frame shown in FIG. 8A are compared with the threshold level THL by the comparator 25. For example, pixel values of the horizontal line Ln are −100 at points A and D (the black portion described above), as shown in FIG. 8B, 100 at points B and C (the white portion described above), and zero at other points. Since the threshold level THL is set to be −50, only the pixel values (−100) at the points A and D, as shown in FIG. 8C, are output.

When the pixel values of the horizontal lines $L_{MIN}$ to $L_{MAX}$ of the subtraction image data are compared with the threshold level by the comparator 25, the white portion $Q_1$ is eliminated, and only the black portions $P_2$ and $P_3$ are obtained, as shown in FIG. 7.

In the subtraction image of each frame, the catheter image of each frame appears, and the catheter image of the immediately preceding frame disappears. Therefore, the operator can manipulate the catheter more easily than that in the first embodiment, thereby reducing the load on the operator.

FIG. 9 is a block diagram showing a main part of a sixth embodiment of the present invention. The sixth embodiment includes an average circuit 40 between an A/D 20 and a subtractor 24 instead of the memory circuit 20 of the first embodiment. The average circuit 40 averages digital image data of the respective frames sequentially supplied from the A/D 20.

The average circuit 40 operates as an averaging means and is arranged as follows. A plurality of memories 21-1 to 22-n are commonly connected to the output terminal of the A/D 20. The digital image data of a plurality of frames output from the A/D 20 are respectively stored in the plurality of memories 22-1 to 22-n. Weighting circuits 42-1 to 42-n are arranged in correspondence with the memories 22-1 to 22-n and have predetermined weighting factors $m_1$ to $m_n$. The weighting circuits 42-1 to 42-n multiply digital image data $X_1$ to $X_n$ output from the corresponding memories 22-1 to 22-n with the weighting factors $m_1$ to $m_n$, respectively. An adder 44 adds the weighted digital image data output from the weighting circuits 42-1 to 42-n.

The average circuit 40 performs the following calculation:

$$(m_1 \cdot X_1 + m_2 \cdot X_2 + \ldots m_n \cdot X_n) \quad (1)$$
$$/(m_1 + m_2 + \ldots m_n)$$
$$\text{for } m_1 + m_2 + \ldots m_n = 1$$

For example, n may be set to be 3, $m_1$ for $X_1$ may be to be 0.85, $m_2$ for $X_2$ may be set to be 0.1, and $m_3$ for $X_3$ may be set to be 0.05.

As another example, n may be set to be 3, and each of $m_1$ to $m_3$ for $X_1$ to $X_3$ may be set to be ⅓. When each of $m_1$ to $m_3$ is set to be ⅓, digital image data of a plurality of frames can be added and averaged.

A difference between the digital image data of each frame output from the A/D 20 and the digital image data which is an average of n frames preceding each frame and output from the average circuit 40 is obtained by the subtractor 24.

When the above average circuit 40 is used, the digital image data are weighted and averaged, so that noise included in the image can be greatly reduced, thereby greatly increasing the signal to noise ratio of the resultant image. Therefore, the operator can easily recognize and manipulate the catheter, and the load on the operator can be greatly reduced.

A seventh embodiment of the present invention will be described below. FIG. 10 is a block diagram showing a main part of the seventh embodiment of the present invention. The seventh embodiment includes a high-pass filter (to be referred to as an HPF hereinafter) 50 and a low-pass filter (to be referred to as an LPF hereinafter) 52 in addition to the arrangement of the first embodiment. The HPF 50 is arranged between a subtractor 24 and a multiplier 30 and serves as a first filter means for extracting only a high-frequency component of subtraction image output from the subtractor 24. The LPF 52 is arranged between an A/D 20 and an adder 32 and serves as a second filter means for extracting only a low-frequency component of digital image data output from the A/D 20. The HPF 50 extracts high-frequency components of, e.g., 5 lp/mm or more to emphasize the image of the guide wire, and the LPF 52 extracts low-frequency components of, e.g., 1 l/pmm or less to reduce or eliminate noise.

The subtraction image data output from the subtractor 24 represents an image of the catheter. Since the catheter is thin as compared to the bone, the subtraction image data includes a relatively high frequency component. For this reason, the HPF 50 extracts the high frequency component corresponding to the catheter from the subtraction image data and suppresses the noise of a low frequency component.

Since digital image data output from the A/D 20 represents fluoroscopic image data representing a bone portion larger than the catheter, this digital image data includes relatively low frequency components. The low-frequency components corresponding to the fluoroscopic image are extracted by the LPF 52 from the digital image data output from the A/D 20, thereby suppressing high-frequency noise components.

The noise can be largely reduced by the LPF 52 and the HPF 50, and the S/N ratio of the resultant image can be increased. Therefore, the catheter can be easily recognized, and the operator can easily manipulate the catheter.

An eighth embodiment of the present invention will be described below. The eighth embodiment is obtained by applying the seventh embodiment to the sixth embodiment. More specifically, since the eighth embodiment employs an average circuit 40, an HPF 50, and an LPF 52, noise can be reduced more than in the sixth and seventh embodiments. Therefore, the operator can manipulate the catheter more easily.

The present invention is not limited to the particular embodiments described above. The above embodiments exemplify X-ray diagnostic apparatuses. However, the present invention is applicable to a radiation diagnostic apparatus using γ-rays. In addition, the first to eighth embodiments may be varyingly combined. The image data of the preceding frame may be pre-processed by using a filter in a time domain so as to reduce noise. For example, the image data may be supplied to a recursive filter or is averaged for several frames. In the above embodiments, and the weighting factors are set from the console 26 but predetermined values may be used as weighting factors if desired.

One of the memories in the memory circuit 22 stores an image of an immediately preceding frame. However, the memory circuit 22 may have three or more memories, and image data of the first preceding frame, the second preceding frame, the third preceding frame, ... may be stored in the memory circuit. Various changes and modifications may be made without departing from the spirit and scope of the invention.

According to the present invention, as has been described above, since a difference between the image data of the first predetermined frame and the image data of the second predetermined frame prior to the first predetermined frame is obtained, subtraction data comprises only motion image data. In addition, the subtraction image data is multiplied with the corresponding weighting factor to emphasize only the motion image. The operator can easily discriminate the motion of the catheter from other motions. Therefore, the operator can easily manipulate the catheter, and the load on the operator can be reduced without increasing the amount of radiation transmitted through the patient to be examined.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. An image display apparatus for radiation diagnosis, comprising:
   radiation detector means for obtaining image data;
   image input means for inputting image data of a plurality of frames obtained by irradiating a radiation onto a patient to be examined, the patient being injected with a catheter in a blood vessel thereof;
   emphasizing means, responsive to said image input means, for processing the image data so as to emphasize a difference between image data of first and second predetermined frames in the input image data;
   display means, responsive to said emphasizing means, for displaying the emphasized image data which is processed by said emphasizing means; and
   said emphasizing means comprising:
   subtracting means, responsive to said image input means, for calculating a difference between image data of first and second predetermined frames of the image data of the plurality of frames input from said image input means, and for obtaining subtraction image data;
   first filter means, responsive to said subtraction means, for extracting a frequency component higher than a first predetermined frequency of the subtraction image data from said subtracting means;
   calculating means, responsive to said first filter means, for processing the subtraction image data extracted from said first filter means by using a predetermined weighting factor, and for weighting the subtraction image data; and
   adding means, responsive to said calculating means and said second filter means, for adding the subtraction image data weighted by said calculating means and the image data input from said image input means.

2. An apparatus according to claim 1, in which the second predetermined frame precedes the first predetermined frame by one frame.

3. An apparatus according to claim 1, in which the radiation consists of X-rays.

4. An apparatus according to claim 1, in which said subtracting means comprises:
   a subtractor, responsive to said image input means, for calculating a difference between image data of a first predetermined frame of the image data of the plurality of frames input from said image input means and image data of a second predetermined frame, and for obtaining subtraction image data; and
   a comparator, responsive to said subtractor, for comparing the subtraction image data from said subtractor with a predetermined value to obtain subtraction image data smaller than the predetermined value.

5. An apparatus according to claim 1, in which said subtracting means comprises:
   an average circuit, responsive to said image input means, for averaging image data of several frames input from said image input means; and
   a subtractor, responsive to said image input means and said average circuit, for calculating a difference between image data of a first predetermined frame input from said image input means and image data of a second predetermined frame input from said average means to obtain the subtraction image data.

6. An apparatus according to claim 1, said apparatus further including:
   second filter means, responsive to said calculating means and said image input means, for adding the subtraction image data weighted by said weighting means and the image data input from said image input means; and
   said adding means being responsive to said calculating means and said second filter means to add the subtraction image data weighted by said calculating means and the image data extracted by said second filter means.

7. An image display apparatus for radiation diagnosis, comprising:
   radiation detector means for obtaining image data;

image input means for inputting image data of a plurality of frames obtained by irradiating a radiation onto a patient to be examined, the patient being injected with a catheter in a blood vessel thereof;

emphasizing means, responsive to said image input means, for processing the image data so as to emphasize a difference between image data of first and second predetermined frames in the input image data;

display means, responsive to said emphasizing means, for displaying the emphasized image data which is processed by said emphasizing means; and said emphasizing means comprising:

subtracting means, responsive to said image input means, for calculating a difference between image data of first and second predetermined frames of the image data of the plurality of frames input from said image input means, and for obtaining subtraction image data;

comparing means, responsive to said subtracting means, for comparing the subtraction image data from said subtracting means with a predetermined value to obtain subtraction image data including image data included in one of the first and second predetermined frames that is newer but not included in the other of the first and second predetermined frames;

calculating means, responsive to said comparing means, for calculating the subtraction image data from said comparing means and a predetermined weighting factor and for weighting the subtraction image data; and adding means, for adding the subtraction image data weighted by said calculating means to said image data from said image inputting means.

8. An apparatus according to claim 7, in which the second predetermined frame precedes the first predetermined frame by one frame.

9. An apparatus according to claim 7, in which said subtracting means outputs subtraction image data having pixel values falling within a range of $-100$ to $+100$.

10. An apparatus according to claim 9, in which the predetermined value in said comparing means is a predetermined value falling within a range of $-100$ to 0.

11. An apparatus according to claim 7, in which the radiation consists of X-rays.

12. An apparatus according to claim 7, in which said subtracting means subtracts an older one of said first and second frames from a newer one and said comparing means obtains subtraction image data smaller than the predetermined value.

13. An apparatus according to claim 7, in which said subtracting means subtracts a newer one of said first and second frames from an older one and said comparing means obtains subtraction image data larger than the predetermined value.

* * * * *